(12) United States Patent  
Stehle et al.

(10) Patent No.: US 9,341,290 B2
(45) Date of Patent: May 17, 2016

(54) LUGGED WAFER ALIGNMENT RING

(71) Applicant: Dieterich Standard, Inc., Boulder, CO (US)

(72) Inventors: John Henry Stehle, Boulder, CO (US); Paul Timothy Deegan, Boulder, CO (US); Dave Craig Winters, Boulder, CO (US)

(73) Assignee: Dieterich Standard, Inc., Boulder, CO (US)

( * ) Notice: Subject to any disclaimer, the term of this patent is extended or adjusted under 35 U.S.C. 154(b) by 66 days.

(21) Appl. No.: 14/499,574

(22) Filed: Sep. 29, 2014

(65) Prior Publication Data

US 2016/0091128 A1    Mar. 31, 2016

(51) Int. Cl.
- G01B 5/25 (2006.01)
- F16L 23/02 (2006.01)
- G01L 9/00 (2006.01)
- G01L 19/00 (2006.01)

(52) U.S. Cl.
CPC . F16L 23/02 (2013.01); G01L 9/00 (2013.01); G01L 19/00 (2013.01)

(58) Field of Classification Search
CPC ..... G01L 19/00; G01L 19/0007; F16L 23/02; G01B 5/25
USPC .................... 33/412, 529, 613, 645
See application file for complete search history.

(56) References Cited

U.S. PATENT DOCUMENTS

| 1,958,854 | A | | 5/1934 | Kellett | |
|---|---|---|---|---|---|
| 4,623,123 | A | * | 11/1986 | Traylor | F16L 19/0231 251/340 |
| 5,222,306 | A | * | 6/1993 | Neumann | G01B 5/25 29/272 |
| 5,456,288 | A | | 10/1995 | Jacobs | |
| 5,582,211 | A | | 12/1996 | Monson | |
| 5,737,913 | A | * | 4/1998 | Terry | F01D 25/243 285/360 |
| 5,893,544 | A | * | 4/1999 | Chen | A47B 96/061 248/220.21 |
| 6,053,055 | A | | 4/2000 | Nelson | |
| 6,922,906 | B2 | * | 8/2005 | Choi | B82Y 10/00 33/613 |
| 7,284,450 | B2 | | 10/2007 | Orleskie et al. | |
| 7,406,880 | B2 | | 8/2008 | Orleskie et al. | |
| 7,805,777 | B2 | * | 10/2010 | Hughes | E03D 11/16 33/562 |
| 8,684,023 | B2 | | 4/2014 | Deegan et al. | |
| 2006/0022466 | A1 | | 2/2006 | Sand et al. | |

(Continued)

FOREIGN PATENT DOCUMENTS

| EP | 2 423 652 | 2/2012 |
|---|---|---|
| GB | 2 086 590 | 5/1982 |

(Continued)

OTHER PUBLICATIONS

Correction Notification from the Chinese Patent & Trademark Office dated May 19, 2015 corresponding to Chinese patent application No. 201520148031.1 filed on Mar. 16, 2015.

(Continued)

*Primary Examiner* — G. Bradley Bennett
(74) *Attorney, Agent, or Firm* — Westman, Champlin & Koehler, P.A.

(57) ABSTRACT

Systems, apparatus and methods are disclosed for coupling a wafer style primary element of a process measurement system between process pipes in a manner which aligns the primary element with the process pipes, while maintaining alignment and preventing leaking in the event of a dynamic shock to the process pipes.

21 Claims, 12 Drawing Sheets

(56) References Cited

U.S. PATENT DOCUMENTS

| | | | | |
|---|---|---|---|---|
| 2008/0078095 A1* | 4/2008 | Olsen | ................. | B23Q 3/186 33/636 |
| 2009/0265947 A1* | 10/2009 | Sanders | ................. | D21F 5/02 33/517 |
| 2012/0024068 A1* | 2/2012 | Silliman | ................. | F03D 1/003 73/632 |
| 2012/0232554 A1* | 9/2012 | Shaevitz | ................. | A61B 17/171 606/56 |
| 2013/0326890 A1* | 12/2013 | Alexander | ................. | G01B 5/25 33/228 |
| 2014/0260657 A1* | 9/2014 | Strom | ................. | G01F 15/18 73/861 |
| 2014/0260670 A1* | 9/2014 | Strom | ................. | G01F 1/42 73/861.42 |
| 2014/0260671 A1* | 9/2014 | Stehle | ................. | G01F 1/46 73/861.66 |
| 2015/0128436 A1* | 5/2015 | Grimes | ................. | H01L 21/6715 33/645 |

FOREIGN PATENT DOCUMENTS

| | | |
|---|---|---|
| WO | WO 96/10161 | 4/1996 |
| WO | WO 2008/088646 | 7/2008 |

OTHER PUBLICATIONS

Notification of Transmittal of the International Search Report and the Written Opinion of the International Searching Authority from PCT/US2015/045624, dated Dec. 11, 2015.

* cited by examiner

LUGGED WAFER ALIGNMENT RING

BACKGROUND

The present disclosure relates to industrial process control or monitoring systems. More specifically, the present disclosure relates to process variable transmitters or sensing devices of the type which use wafer or compact style primary sensor elements to measure a process variable of an industrial process.

In industrial settings, control systems are used to monitor and control inventories of industrial and chemical processes, and the like. Typically, the control system that performs these functions uses field devices distributed at key locations in the industrial process and coupled to control circuitry in the control room by a process control loop. The term "field device" refers to any device that performs a function in a distributed control or process monitoring system, including all devices used in the measurement, control and monitoring of industrial processes.

Some field devices include a transducer which couples to the process fluid. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, actuators, solenoids, indicator lights, and others.

Field devices, such as process variable sensors used in industrial processes can be installed in the field on pipelines, tanks and other industrial process equipment. One type of process variable sensor is a flow meter that can measure a rate of fluid flow, for example. One type of flow meter, which employs a differential pressure averaging orifice plate primary element, also referred to as a wafer style primary element, is a popular device for flow measurement in certain environments because its use does not require pipe penetration to be made and the device can easily be inserted into an existing flanged joint. Although this design has been popular at utility measurement points, it has lacked adoption at downstream process measurement points, for example such as in the petroleum industry. One of the key concerns of downstream process piping is exposed bolting. One potential issue is that, when a wafer device is mounted between flanges in process piping and is secured by studs and nuts, the additional length to span the distance of the wafer and sealing gaskets could be a concern and is therefore often not preferred. This additional length is referred to as exposed bolting.

One of the reasons exposed bolting is a concern is the integrity of the piping. Often during startup or shutdown a pipeline may experience a dynamic shock and flanged connections can be possible process leak points. A wafer type device can exacerbate this possibility because the tolerance of the flange bolt holes to stud diameter have more room for the flanges to misalign under these conditions. The greater distance between the flanges the more this misalignment can be pronounced and the greater the chance for a leak to occur at that joint. Another reason exposed bolting is a concern is in the event of a fire, studs would heat up faster than the pipe and expand, reducing pressure on the gasket sealing surface, and losing pressure containment.

The discussion above is merely provided for general background information and is not intended to be used as an aid in determining the scope of the claimed subject matter.

SUMMARY

Systems, apparatus and methods are disclosed for coupling a wafer style primary element of a process measurement system between process pipes in a manner which aligns the primary element with the process pipes, while maintaining alignment and preventing leaking in the event of a dynamic shock to the process pipes.

In some exemplary embodiments, process measurement system alignment devices, for maintaining alignment of a wafer style primary element between flanges of first and second process pipes, are disclosed. An alignment ring has an inner surface forming an interior region into which the primary element can be inserted such that the alignment ring encompasses at least a portion of the primary element. A channel formed in the alignment ring is configured to receive an interconnecting neck of the primary element when the primary element is inserted into the interior region of the alignment ring such that the interconnecting neck of the primary element extends outside of the alignment ring. A plurality of flange fastener receiving apertures are formed in the alignment ring and configured to be aligned with flange apertures in the flanges of the first and second process pipes and to receive threaded flange fasteners, such as studs or bolts, extending through aligned flange apertures.

In some exemplary embodiments, the flange fastener receiving apertures are threaded apertures configured to receive threaded studs or bolts.

In some exemplary embodiments, the plurality of alignment tabs are spaced around the alignment ring. Also, in some embodiments, at least one of the plurality of alignment tabs is configured to be removably attached to the alignment ring such that the at least one of the alignment tabs can be removed to allow the alignment ring to be inserted between the flanges of the first and second process pipes, and subsequently reattached after the alignment ring is positioned between the flanges of the first and second process pipes.

In some disclosed embodiments, a plurality of alignment pins are spaced around the inner surface of the alignment ring to maintain the primary element at a proper position within the interior region and thereby aligned with the first and second process pipes. Further, in some embodiments, the plurality of alignment pins include first alignment pins on an upper portion of the inner surface of the alignment ring and second alignment pins on a lower portion of the inner surface of the alignment ring, and the second alignment pins extend further into the interior region than do the first alignment pins. Tolerance stack of keeps the studs lose in the flanges so gravity will pull the primary low during alignment. The pins on the lower side of the pipe are longer to help center the primary in the pipe.

In some disclosed embodiments, a plurality of alignment screws extend from the one or more outer surfaces of the alignment ring to the inner surface of the alignment ring to adjust a position of the primary element within the interior region and thereby align the primary element with the first and second process pipes.

In some exemplary embodiments, sleeves are configured to be placed over the threaded flange fasteners in order to position the threaded flange fasteners in centers of the flange apertures to improve alignment.

In some example embodiments, a system for measuring a process variable of a process fluid in first and second process pipes having flanges is disclosed. The system can include a process transmitter, and a wafer style primary element having an interconnecting neck for use in coupling the primary element to the process transmitter. The primary element is configured to be positioned between the flanges in contact with the process fluid for use in measuring the process variable. A plurality of threaded flange fasteners are provided, as is an alignment ring. The alignment ring forms an interior region in which the primary element is at least partially positioned, and the alignment ring include a channel configured to receive the interconnecting neck of the primary element such that the interconnecting neck of the primary element extends outside of the alignment ring. A plurality of flange fastener receiving apertures are included in the alignment ring and are configured to be aligned with flange apertures in the flanges of the first and second process pipes and to receive the threaded flange fasteners extending through aligned flange apertures. A plurality of nuts are each fastened to an end of one of the plurality of threaded flange fasteners after each threaded flange fastener has been inserted through a flange aperture in the flange of the first process pipe, a flange fastener receiving aperture in the alignment ring, and a flange aperture in the flange of the second process pipe to maintain the primary element in an aligned position in the event of a dynamic shock to the first or second process pipes.

In some disclosed embodiments, there are at least eight flange fastener receiving apertures spaced around the alignment ring to allow the wafer style primary element and process transmitter to be installed in different orientations relative to the first and second process pipes.

In some disclosed embodiments, the alignment ring includes a plurality of alignment tabs positioned on an outer portion of the alignment ring such that the alignment tabs are configured to make contact with at least one of the flanges of the first and second process pipes to align the alignment ring and the primary element with the first and second process pipes. In some embodiments, at least one of the plurality of alignment tabs is configured to be removably attached to the alignment ring such that the at least one of the plurality of the alignment tabs can be removed before the alignment ring is inserted between the flanges of the first and second process pipes, and subsequently reattached after the alignment ring is positioned between the flanges of the first and second process pipes.

In some embodiments, the alignment ring includes a plurality of alignment pins spaced around an inner portion of the alignment ring to maintain the primary element at a proper position within the interior region and thereby aligned with the first and second process pipes. Also, in some embodiments, the plurality of alignment pins include first alignment pins on an upper portion of the alignment ring and second alignment pins on a lower portion of the alignment ring, with the second alignment pins extending further into the interior region of the alignment ring than do the first alignment pins. Tolerance stack of keeps the studs lose in the flanges so gravity will pull the primary low during alignment. The pins on the lower side of the pipe are longer to help center the primary in the pipe.

In some embodiments, the alignment ring includes a plurality of alignment screws extending from the outer portion of the alignment ring to the inner portion of the alignment ring to adjust a position of the primary element within the interior region and thereby align the primary element with the first and second process pipes.

Also disclosed are methods of coupling a wafer style primary element of a process measuring system between first and second process pipes to measure a process variable of process fluid in the first and second process pipes. In some embodiments, the method includes encompassing the primary element in an interior region of an alignment ring such that an interconnecting neck of the primary element is positioned in a channel formed in the alignment ring and extends outside of the alignment ring. The alignment ring and encompassed primary element are inserted between flanges of each of the first and second process pipes such that the primary element is aligned with the first and second process pipes. Each of a plurality of flange fasteners are inserted through a corresponding one of a plurality of flange apertures in the flange of the first process pipe, through a corresponding one of a plurality of alignment apertures of the alignment ring, and through a corresponding one of a plurality of flange apertures in the flange of the second process pipe in order to capture the flange fastener and prevent misalignment of the alignment ring or leaking of the process fluid in the event of a pipeline shock. The alignment ring and other components used in disclosed methods can include any combination of disclosed features in various embodiments.

For example, in some embodiments, the step of inserting the alignment ring and encompassed primary element between the flanges of each of the first and second process pipes such that the primary element is aligned with the first and second process pipes further comprises removing an alignment tab from the alignment ring, inserting the alignment ring and encompassed primary element between the flanges of each of the first and second process pipes, and reattaching the alignment tab to the alignment ring. In another example, the step of encompassing the primary element in the interior region of the alignment ring further comprises using alignment pins or screws extending into the interior region of the alignment ring to position the primary element in the interior region and align the primary element with the first and second process pipes.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

It must be noted that any of the disclosed features, components, apparatus, systems and method steps can be used in any combination with other disclosed features, components, apparatus, systems and method steps. The present disclosure includes such alternate combinations even though the disclosed features, components, apparatus, systems and method steps are not illustrated or discussed in combination in the example embodiments provided.

DETAILED DESCRIPTION OF ILLUSTRATIVE EMBODIMENTS

Disclosed embodiments provide improved installation and alignment of a wafer style primary element between process pipes. Using the disclosed apparatus, systems and methods, improved alignment of the primary element with the process pipes is achieved, while maintaining the alignment and preventing process fluid leaks in the event of the occurrence of a dynamic shock to the process pipes. In reducing exposed bolting and preventing process fluid leaks and misalignment of the primary element in the event of dynamic shock events, disclosed embodiments can increase the use of wafer style primary elements in a variety of challenging environments. Improving alignment, reducing exposed bolting and preventing leaks can be achieved using configurations including alignment rings having one or more of the disclosed features.

Figure 1:
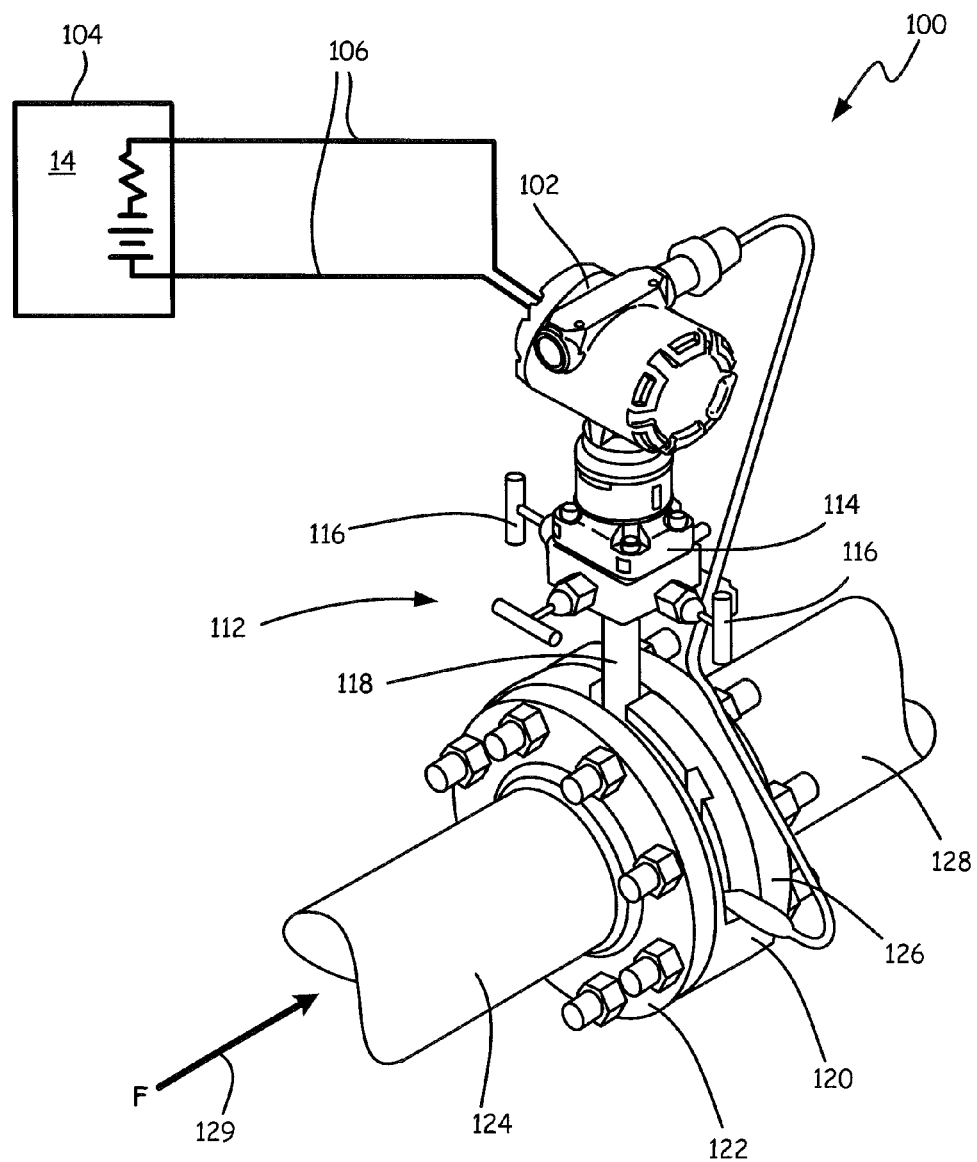
FIG. 1 is a diagrammatic illustration of an industrial process control or monitoring system for use in monitoring or controlling a process fluid in accordance with an example embodiment in which a wafer style primary element is inserted between process flanges using an alignment ring which captures threaded fasteners.

Some industrial process control or monitoring systems, for example some differential pressure (DP) based control or monitoring systems, utilize a differential pressure averaging orifice plate primary element, also referred to as a wafer style primary element, inserted between flanges in a process pipe or conduit to measure a differential pressure related of flow of material through the conduit. One such industrial process control or monitoring system 100 is shown in FIG. 1. FIG. 1 is a simplified diagram showing system 100 for use in monitoring or controlling a process fluid in an industrial process.

Typically, a field device such as a process variable transmitter 102 is located at a remote location, and transmits a sensed process variable back to a centrally-located control room 104. Various techniques can be used for transmitting the process variable, including both wired and wireless communications. One common wired communication technique uses what is known as a two-wire process control loop 106 in which a single pair of wires is used to both carry information as well as provide power to the transmitter 102. One technique for transmitting information is by controlling the current level through the process control loop 106 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless process control loop protocols, such as radio-frequency communication techniques including WirelessHART®, may also be implemented. Process control loop 106 in FIG. 1 represents either or both of wired and wireless embodiments of communication connections between transmitter 102 and control room 104.

Figure 2:
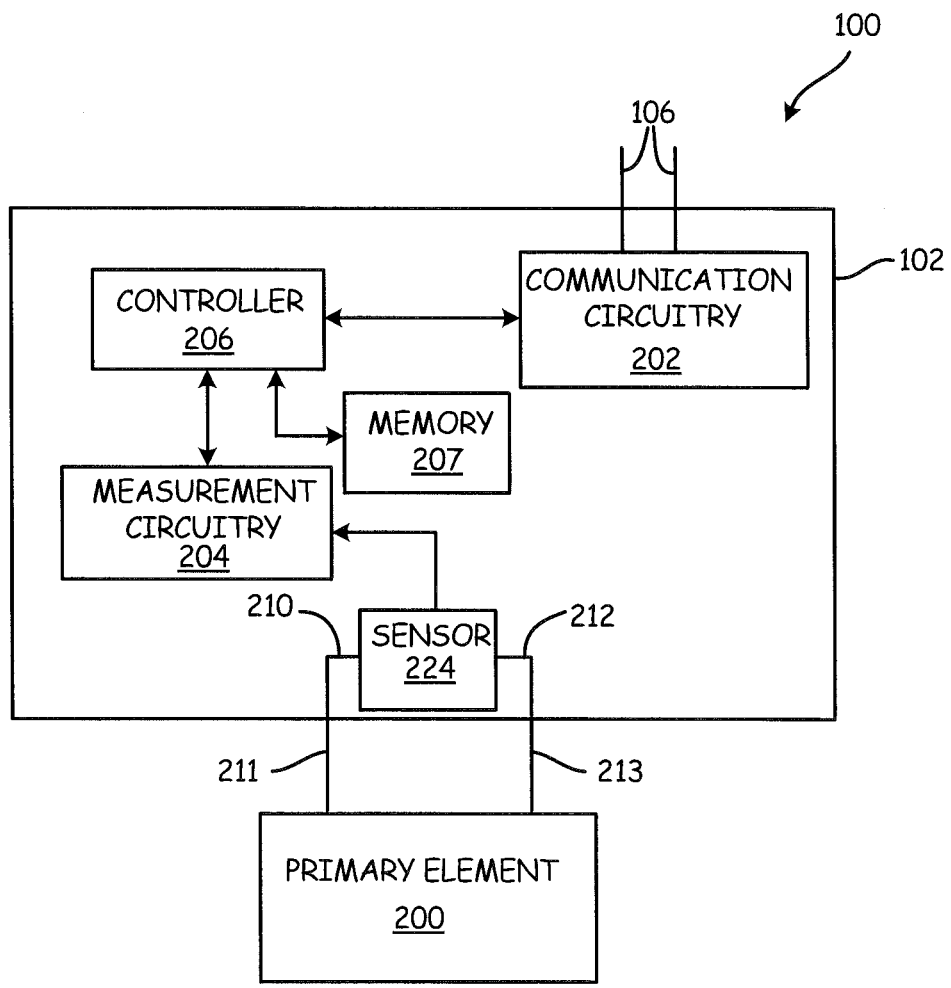
FIG. 2 is a block diagram of the system and transmitter shown in FIG. 1 in accordance with an example embodiment.

Process variable transmitter 102 is connected, via a transmitter coupling system or apparatus 112, one example embodiment of which is shown in FIG. 1 to include a manifold 114 with valves 116, to a wafer style primary element 200 (shown in FIG. 2). The connection to the wafer style primary element 200 is through an interconnecting neck 118 of the primary element which includes pressure conveying conduits for conveying process pressures. Wafer style primary element 200 is supported in place between flanges 122 and 126 of process pipe sections 124 and 128 by an alignment ring 120 in accordance with disclosed embodiments. Primary element 200 is configured to measure a process variable of process fluid in the process piping including pipe sections 124 and 128. Example process variables include flow, temperature, pressure, level, pH, conductivity, turbidity, density, concentration, chemical composition, etc., but in exemplary disclosed embodiments the process variable is a pressure or pressure differential. In an exemplary embodiment, the measured process variable is flow of process fluid, represented by arrow 129, through the process piping including pipe sections 124 and 128. Wafer style primary element can be, for example, as disclosed in U.S. Pat. No. 7,406,880, U.S. Pat. No. 7,284,450 or U.S. Pat. No. 8,684,023 in exemplary embodiments.

As shown in the system block diagram of FIG. 2, process variable transmitter 102 includes a sensor 124 and other components/circuitry (not shown in FIG. 1) that are configured to receive a process variable from primary element 200 and provide a transmitter output on process control loop 106. As discussed, in exemplary embodiments, process variable transmitter 102 is a differential pressure transmitter and primary element 200 is a wafer style primary element which is positioned between flanges 122 and 126 of the process pipe sections. Components of differential pressure transmitter 102 and primary element 200 are described below in in greater detail.

As in FIG. 1, system 100 shown in FIG. 2 is coupleable to a process control loop such as loop 106 and is adapted to communicate a process variable output related to a differential pressure of fluid flow within a conduit including process pipe sections 124 and 128. Transmitter 102 of system 100 includes a loop communication circuitry 202, pressure sensor 124, measurement circuitry 204, and controller 206.

Loop communication circuitry 202 is coupleable to the process control loop 106 and is adapted to communicate upon the process control loop. Loop communication circuitry 202 can include circuitry for communicating over a wired communication link and/or a wireless communication link. Such communication can be in accordance with any appropriate process industry standard protocol such as the protocols discussed above, including both wired and wireless protocols.

In some exemplary embodiments, pressure sensor 224 includes first and second ports 210, 212 which are coupled to first and second pressure conveying conduits 211, 213 extending through interconnecting neck 118 of primary element 200, respectively. Coupling of pressure sensor 224 to conduits 211 and 213 includes coupling through isolation diaphragms and other pressure conveying apparatus and configurations. Sensor 224 can be any device that has an electrical characteristic that changes in response to changes in applied pressure. For example, sensor 224 can be a capacitive pressure sensor the capacitance of which changes in response to the differential pressure applied between ports 210 and 212.

Measurement circuitry 204 is coupled to sensor 124 and is configured to provide a sensor output related at least to differential pressure between ports 210 and 212. Measurement circuitry 204 can be any electronic circuitry that can provide a suitable signal related to differential pressure. For example, measurement circuitry can be an analog-to-digital converter, a capacitance-to-digital converter or any other appropriate circuitry.

Controller 206 is coupled to measurement circuitry 204 and loop communication circuitry 202. Controller 206 is adapted to provide a process variable output to loop communication circuitry 202, which output is related to the sensor output provided by measurement circuitry 204. Controller 206 can be a programmable gate array device, a microprocessor, or any other appropriate device or devices. Although loop communication circuitry 202, measurement circuitry 204 and controller 206 have been described with respect to individual modules, it is contemplated that they can be combined such as on an Application Specific Integrated Circuit (ASIC). In an exemplary embodiment, memory 207 is included and is coupled to controller 206 for storage of computer readable instructions, parameter values, etc. used to configure controller 206 and/or measurement circuitry 204.

Figure 3:
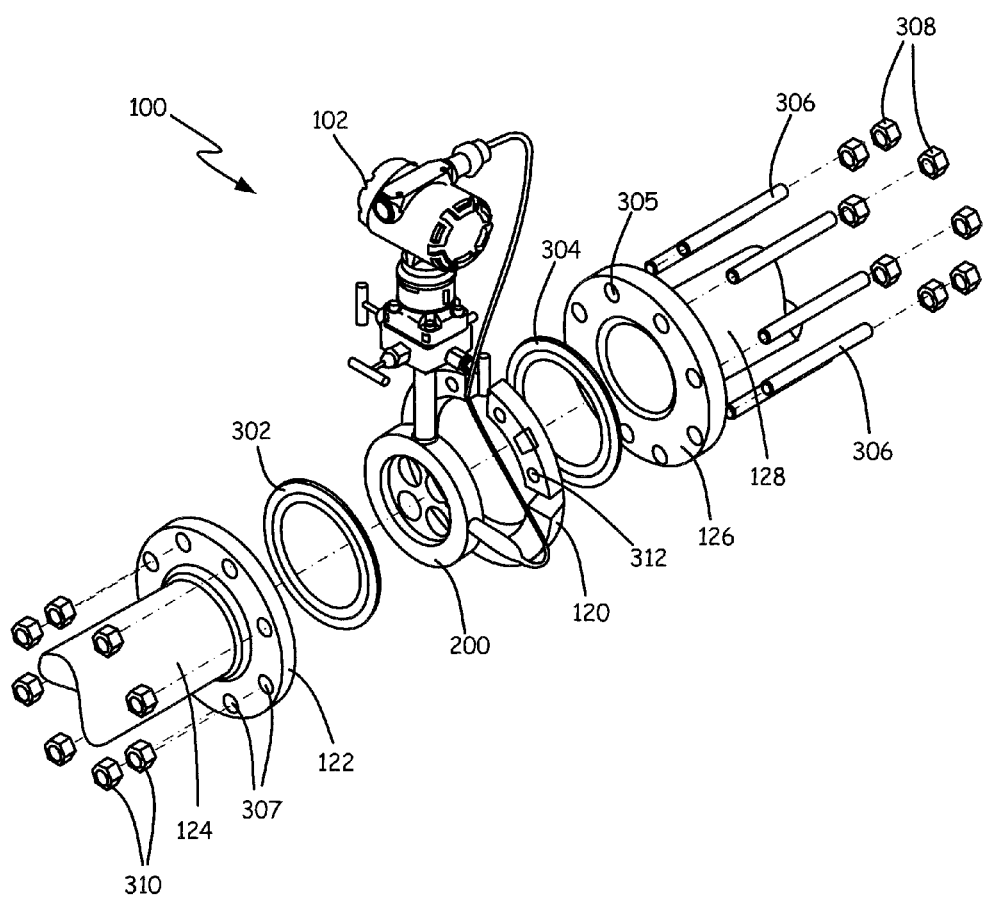
FIG. 3 is a diagrammatic exploded view illustration of components of the system of FIGS. 1 and 2.

Referring now to FIG. 3, shown is an exploded view of components of system 100 and the process piping sections between which primary element 200 is positioned using wafer alignment ring 120. The wafer style primary element should be aligned in the pipeline between flanges 122 and 126 to ensure accurate measurement. Conventional alignment rings used for positioning wafer style primary elements rest on the flange bolting to achieve this, but in the event of pipeline shock the studs are prone to movement, resulting in misalignment which can cause leaking and measurement error. In exemplary embodiments, alignment ring 120 is a lugged alignment ring which reduces the exposed bolting and the opportunity for misalignment and leaking caused by pipeline shock and reduces the risk of pressure loss due to exposed bolts increasing in length in a fire. For example, as better illustrated in FIG. 4, alignment ring 120 is lugged by having apertures 312 extending therethrough for receiving threaded studs 306 and limiting the ability of studs 306 to move in response to pipeline shock. Although studs 306 are one type of flange fastener, the flange fastener receiving apertures 312 in alignment ring 120 can receive other types of flange fasteners as well. In some exemplary embodiments, apertures 312 are threaded apertures which interface with threads on the studs 306 to even further limit the ability of studs 306 to move. However, apertures 312 need not be threaded in all embodiments to reduce the amount of exposed bolting and to limit the ability of the studs to move and thereby allow misalignment. In non-threaded embodiments, which can allow for faster installation, having the studs 306 captured or constrained within apertures 312 reduces the ability of the studs to move as compared to conventional wafer style primary element alignment ring designs in which the alignment ring does not form enclosed apertures through which the studs are inserted.

Figure 4:
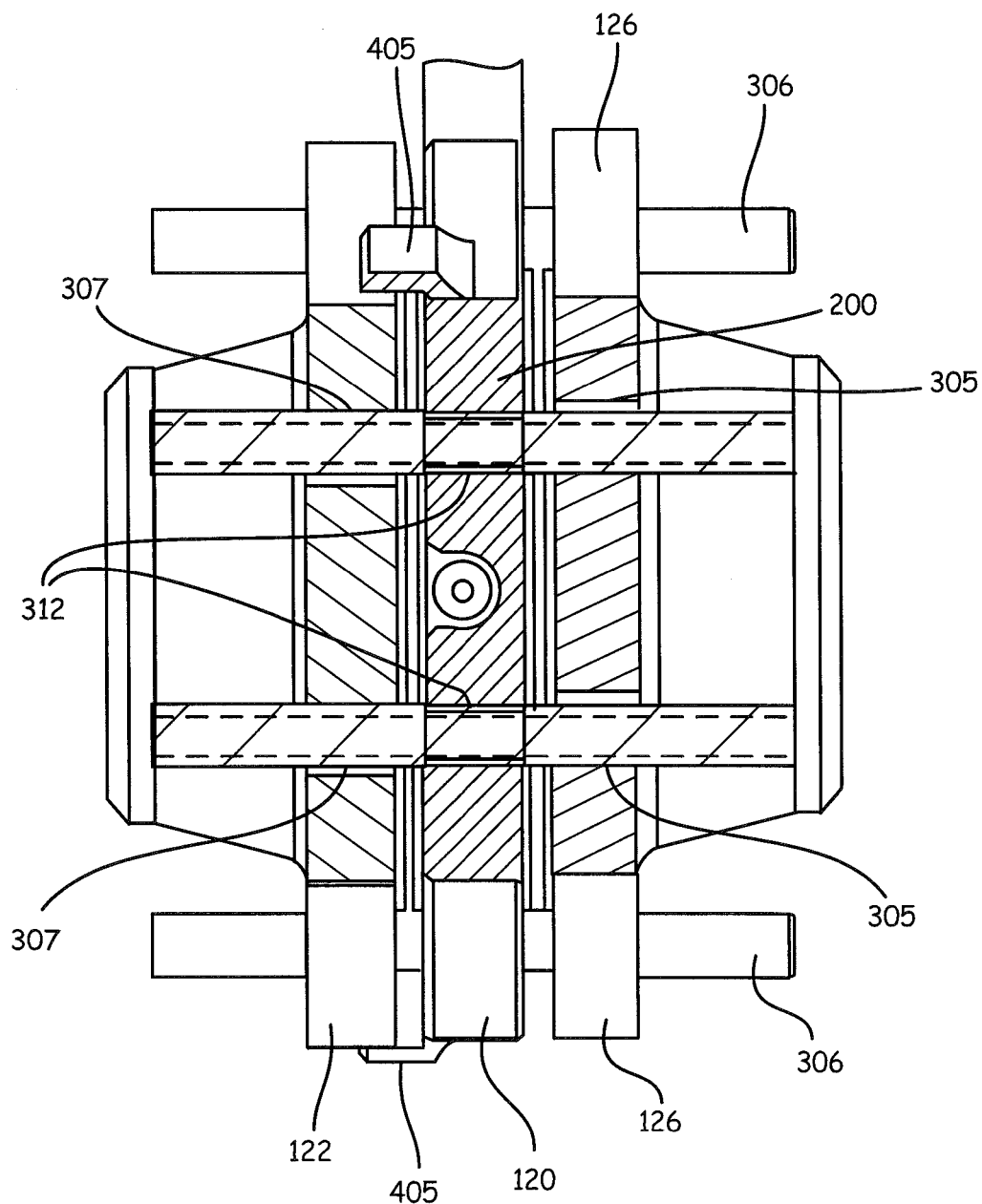
FIG. 4 is a side view illustration, with portions shown in cross section, of a disclosed alignment ring and encompassed primary element connected between flanges of first and section process pipes.

Alignment ring 120 encompasses wafer style primary element 200 and centers the transmitter in flanges 122 and 126, while covering most or the entire portion of studs 306 that extend between the flanges. As shown in FIGS. 3 and 4, flange 126 includes apertures 305 for receiving studs 306, while flange 122 includes corresponding apertures 307 which also receive studs 306. With the apertures 305, 312 and 307 aligned, studs 306 are extended through the series of apertures, and nuts 308 and 310 are attached over the ends of studs 306 to secure the components together with gaskets 302 and 304 included to prevent leaks. FIG. 4 illustrates the structure with shifting between flanges 122 and 126 due to shock, while the threaded design helps to keep the studs parallel to the pipeline and provide a more consistent force for maintaining the seal.

As can be seen in FIG. 4, the lugged alignment ring 120 is slightly thinner than wafer style primary element 200 to ensure that the entire clamping pressure will be applied to the wafer and none onto the alignment ring. In exemplary embodiments, the alignment ring 120 has a minimum of eight threaded bolt holes or apertures 312. In some embodiments, the number of threaded apertures 312 in alignment ring 120 matches the number of apertures 305 and 307 in flanges 126 and 122, but this need not be the case in all embodiments. For example, in some exemplary embodiments, an alignment ring 120 used with four-bolt flange assemblies can have eight threaded apertures to allow for more configurations. This will allow the wafer unit to be inserted into the pipe in eight different orientations. Alignment tabs 405 shown in FIG. 4 can be included with alignment ring 120 to capture portions of one or both of flanges 122 or 126 to aid in the alignment process.

Alignment ring 120 can be made of different materials, including metals or hard plastics. Less expensive materials can be used in certain applications since the alignment ring does not come into contact with any process fluid. However, for specific applications, different materials can be used to meet the requirements of the specific application.

Figure 5:
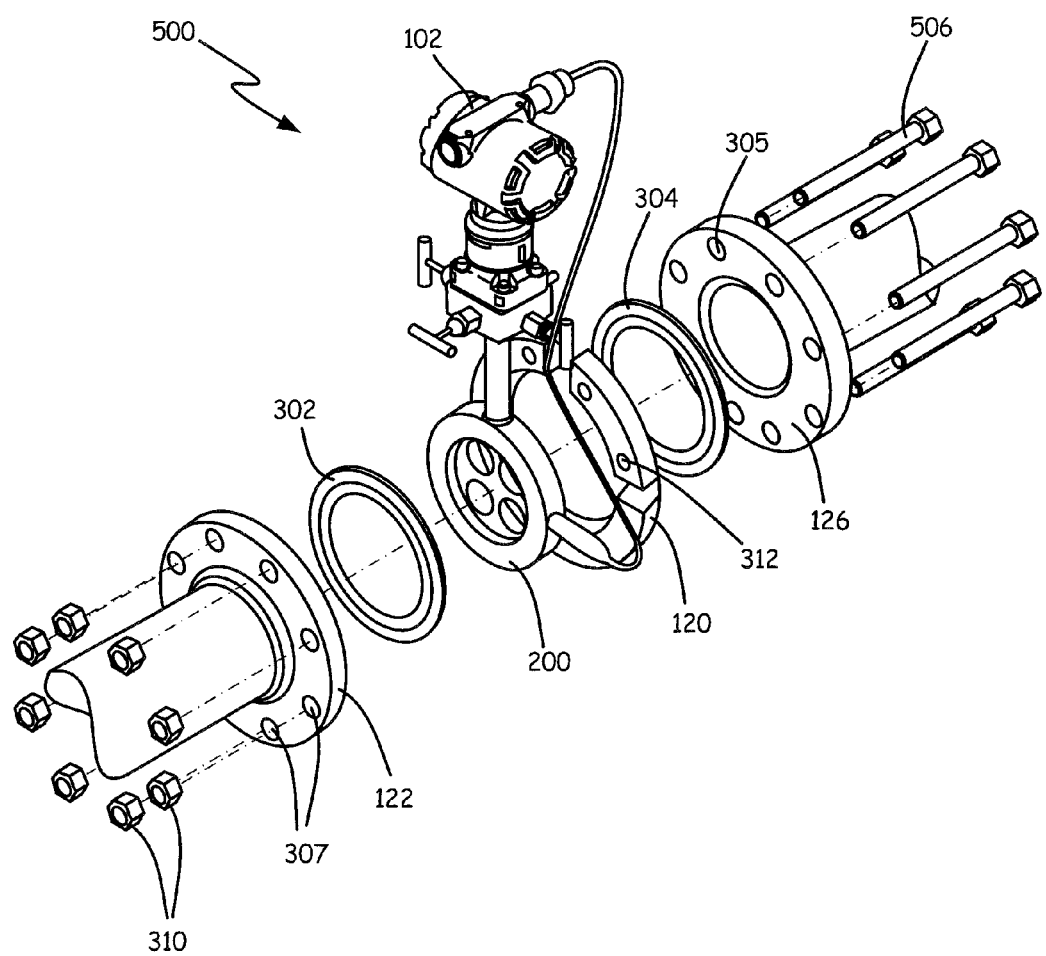
FIG. 5 is a diagrammatic exploded view illustration of components of an alternate system using bolt style threaded fasteners instead of stud style threaded fasteners.

Referring now to FIG. 5, shown is process control or monitoring system 500, which is the same as system 100 discussed above, but including bolts 506 instead of studs 306. Bolts are inserted through apertures 305, 312 and 307, and then nuts 310 are attached over the ends of the bolts to secure the components together. The use of bolts instead of studs can aid installation by allowing the installer to drive the bolts through the assembly with a wrench or impact driver.

Figure 6:
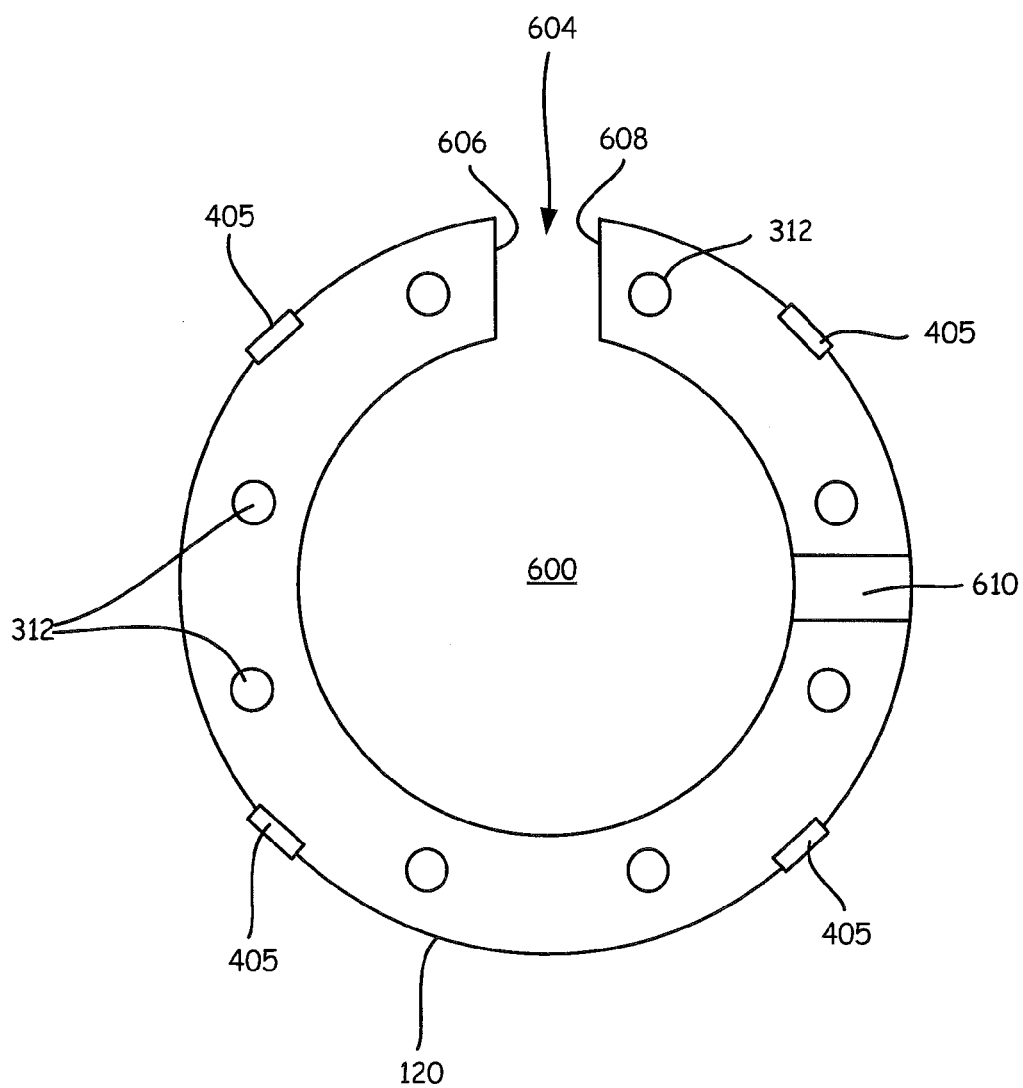
FIG. 6 is a side view illustration of an alignment ring embodiment.
Figure 7:
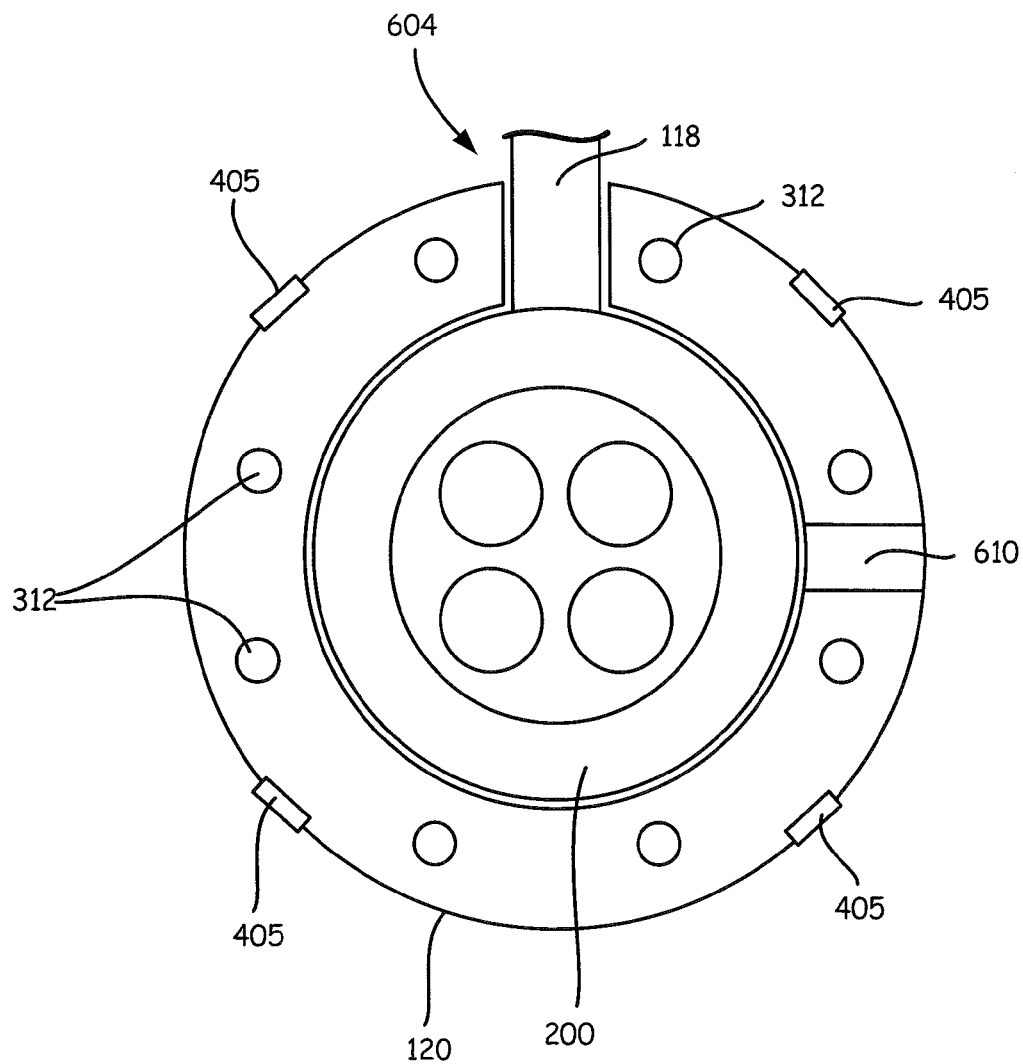
FIG. 7 is a side view illustration of the alignment ring of FIG. 6 with an encompassed primary element.

Referring now to FIG. 6, shown is an end view of alignment ring 120 in an exemplary embodiment. In this embodiment, alignment ring 120 is of a circular or near circular configuration forming an aperture or region 600 into which the primary element 200 is inserted from one of the ends of the alignment ring. FIG. 7 illustrates alignment ring 120 with primary element 200 inserted such that the alignment ring encompasses the primary element. In an example embodiment, the alignment ring is not a closed circle, but instead has two adjacent surfaces 606 and 608 which form a channel 604 through which interconnecting neck 118 of the primary element can extend as shown in FIG. 7. A recess 610, which does not extend through the entire thickness of alignment ring 120, is included in some embodiments to accommodate other wires, tubes or couplings to the primary element or sensor included with the primary element.

Figure 8:
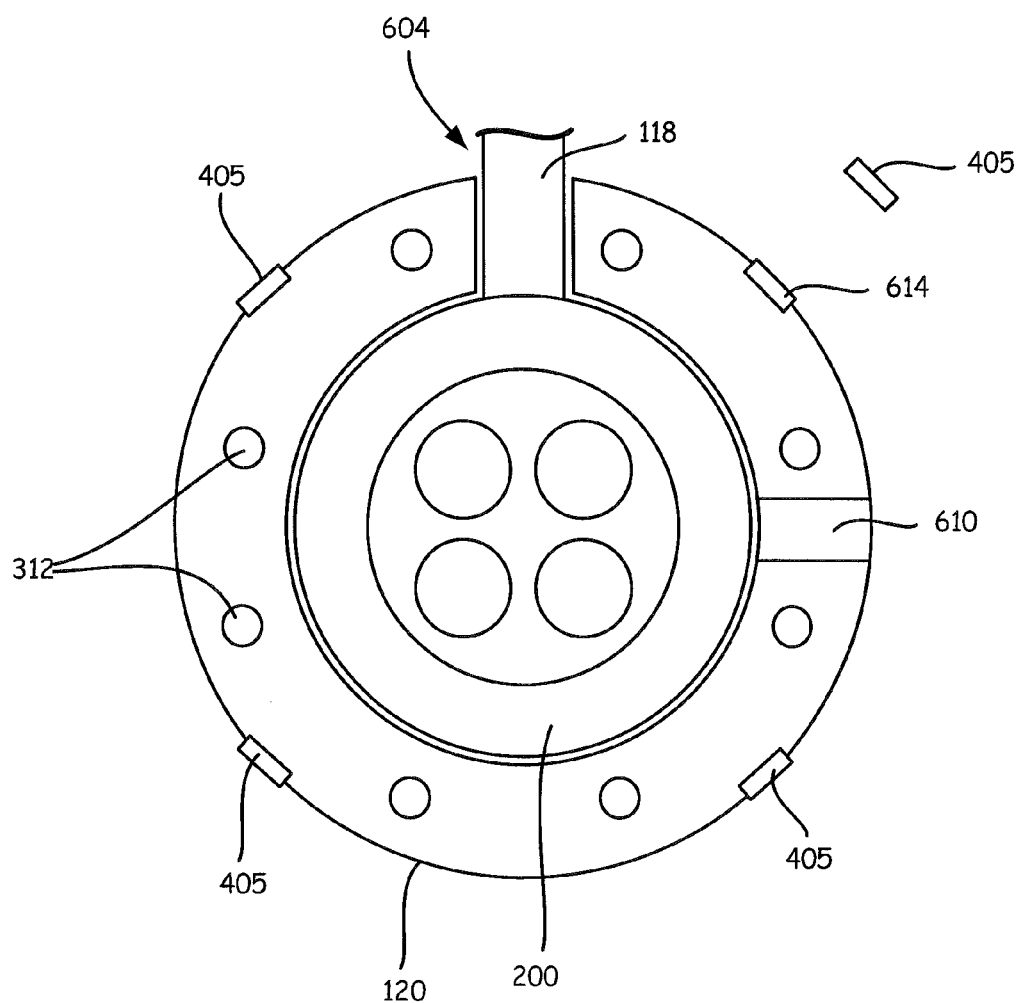
FIG. 8 is a side view illustration of the alignment ring of FIG. 6 and illustrating a removable alignment tab feature of some embodiments.

Also shown in FIGS. 6 and 7 are alignment tabs 405 which can be spaced about an outer surface of the alignment ring for use in aligning the ring with one or both of flanges 122 and 126. Alignment tabs 405 can be welded to alignment ring 120, integrally formed with alignment ring 120, attached to alignment ring 120 using other techniques, etc. In some exemplary embodiments, one or more of alignment tabs 405 can be made to be removable from the alignment ring to allow insertion of the alignment ring and wafer style primary element assembly between pipe flanges even if the pipe flanges can only be spread to the width of the wafer style primary element. The removable alignment tab can then be reattached to the alignment ring. This allows the assembly to be installed in more situations. FIG. 8 illustrates an example embodiment with one of tabs 405 being removable from a slot mechanism 614 formed on the alignment ring 120. In other exemplary embodiments, multiple or all of the alignment tabs can be configured to be removed and reattached to aid in installation.

Figure 9:
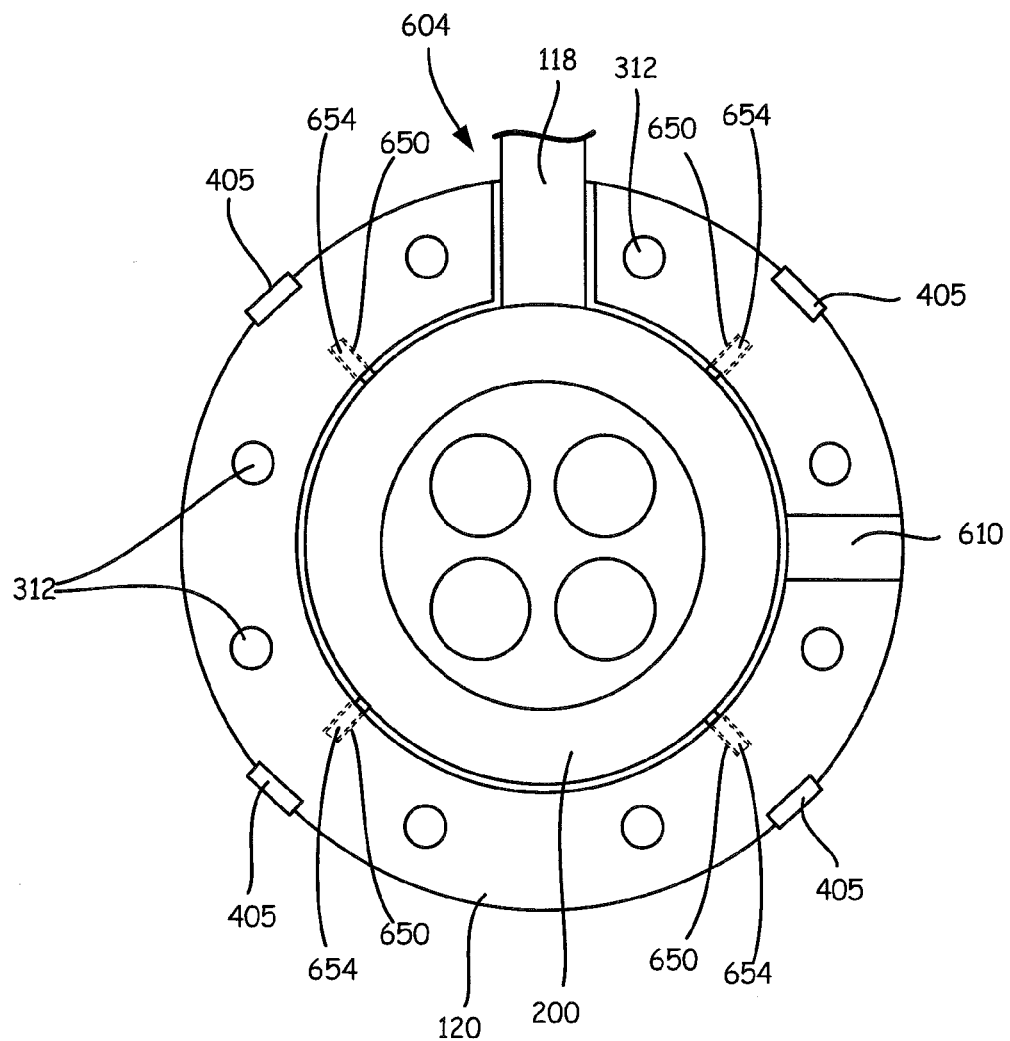
FIG. 9 is a side view illustration of the alignment ring of FIG. 6 and illustrating an alignment pin feature of some embodiments.

In still other embodiments, further or alternate components can be included to aid in achieving and maintaining proper alignment of wafer style primary element 200 between the process pipe sections. For example, as shown in FIG. 9, slots 650 can be included around an inner circumference of alignment ring 120, and alignment pins 652, 654 can be positioned in the slots to maintain the primary element 200 at a proper position within interior region 600 (shown in FIG. 6). The alignment pins 652 on the lower portion of the alignment ring 120 can be longer than the alignment pins 654 of the upper portion, in some embodiments, to push the primary element 200 up into alignment with the centers of the pipe sections. While different length alignment pins can be used in some exemplary embodiments, the alignment pins need not be of different lengths in all embodiments. Further, while four alignment pins are shown in FIG. 9, different numbers of alignment pins can be used, and the alignment pins need not be positioned as shown in FIG. 9.

Figure 10:
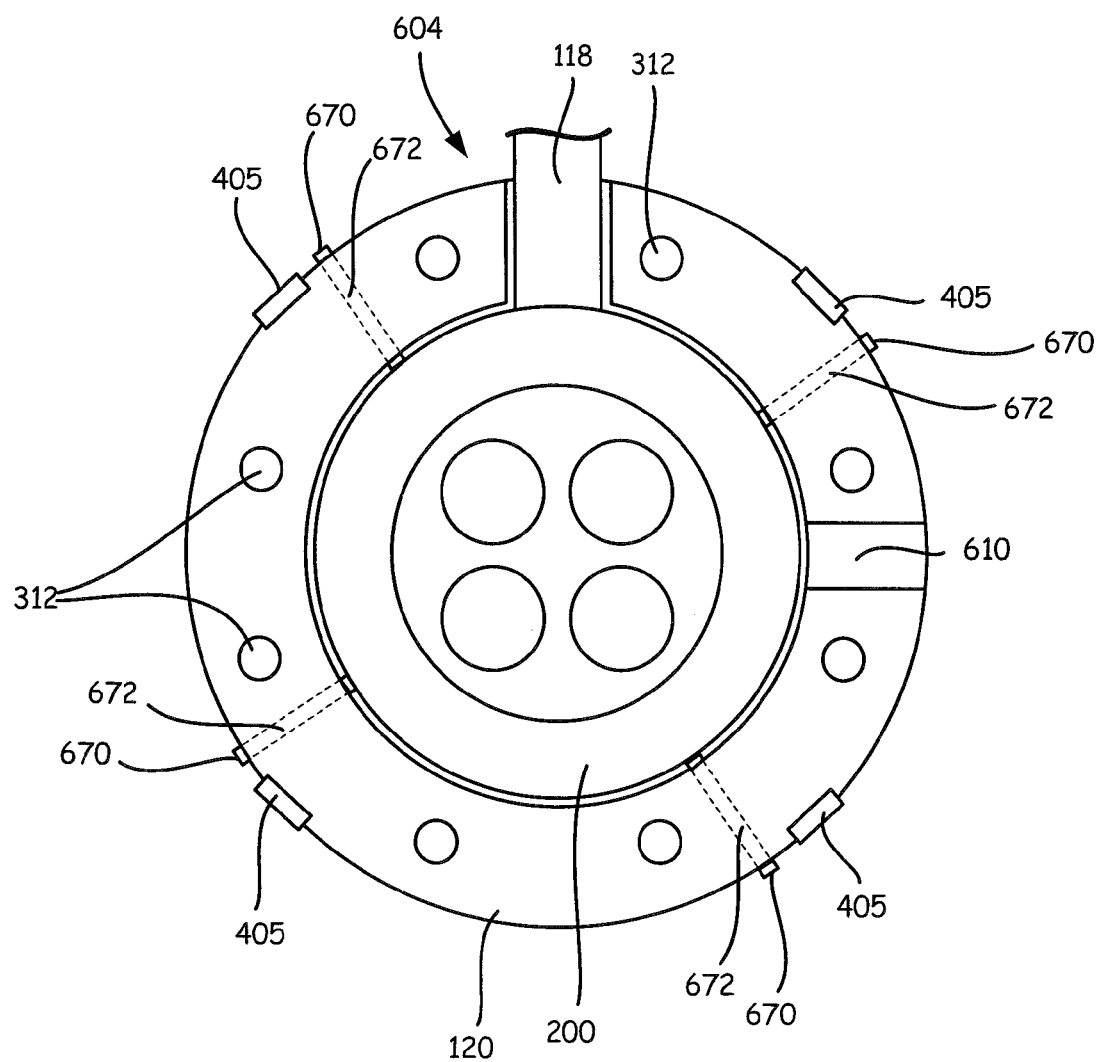
FIG. 10 is a side view illustration of the alignment ring of FIG. 6 and illustrating an alignment screw feature of some embodiments.

In yet another embodiment shown in FIG. 10, alignment screws 670 are placed into alignment ring 120 from the outside of the ring. The alignment screws 670 extend through the alignment ring in threaded apertures 672 which open to the inner circumference of the alignment ring and allow the alignment screws 670 to contact the primary element 200. Using spaced apart alignment screws, the positioning of primary element 200 within the alignment ring can be adjusted to achieve the proper alignment.

Figure 11:
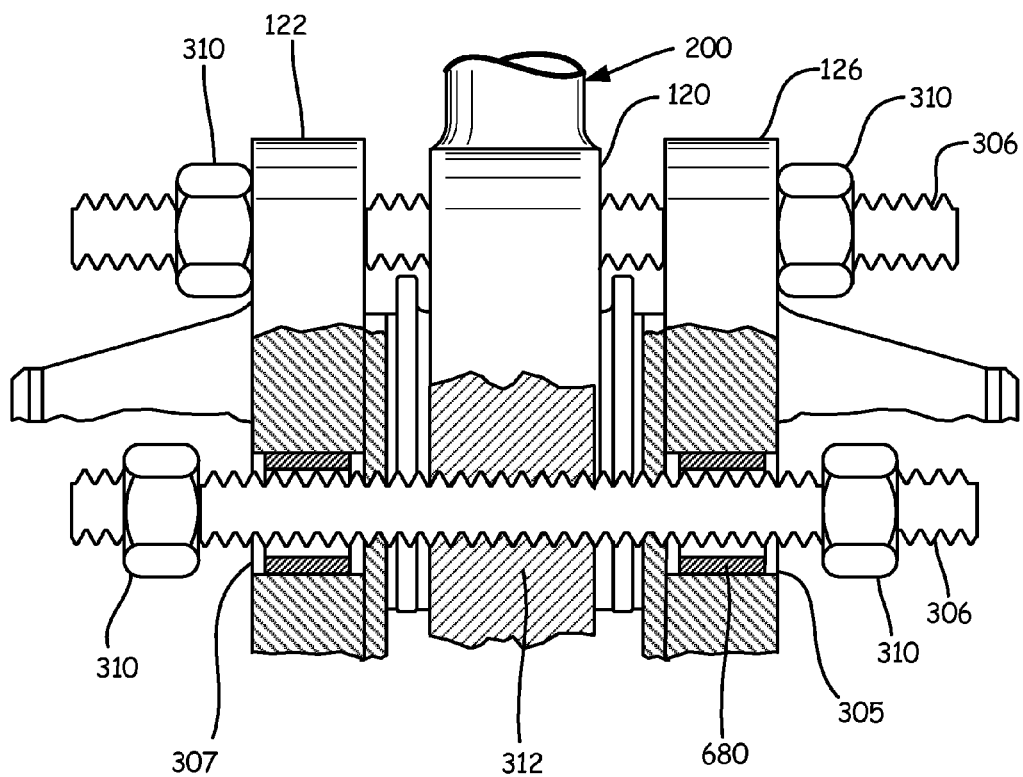
FIG. 11 is a diagrammatic side view illustration of a sleeve placed over a threaded fastener in accordance with some embodiments to better center the threaded fastener in flange or alignment ring apertures.

In yet other embodiments, alignment of the alignment ring and primary element between flanges 122 and 126 is aided by placing thin sleeves 680 over bolts 506, as shown in FIG. 11, in regions of the bolts corresponding to the flange apertures 305, 307 in order to position the bolts in the center of the flange apertures. In FIG. 11, only a portion of bolt 506 is shown, and in exemplary embodiments the sleeve 680 can extend a length that corresponds to the distance between the flanges and includes the width of the flanges such that sleeve 680 covers bolt 506 in both flanges. In other embodiments, multiple separate sleeves are placed over bolt 506 at positions such that the sleeves are each positioned within an aperture of the two flanges. Sleeves 680 can be formed of various materials, including for example, plastic, Teflon or metal.

Figure 12:
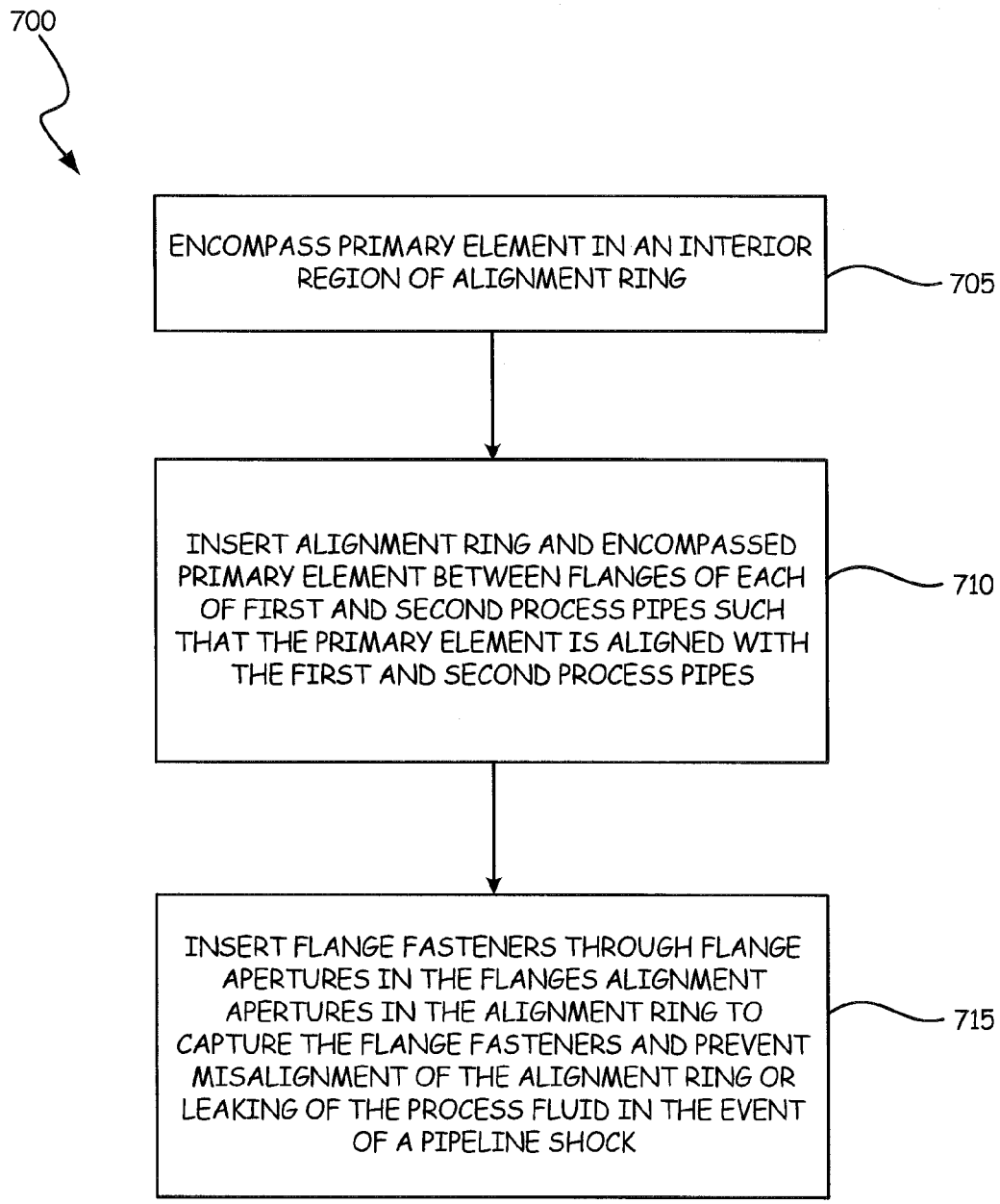
FIG. 12 is a flow diagram illustrating an exemplary method embodiment.

The above described alignment ring embodiments and methods of coupling a wafer style primary element 200 of process measuring system 100 between the first and second process pipes 124 and 128 to measure a process variable can be implemented in numerous exemplary embodiments encompassed within the scope of the present disclosure. For example, one such method embodiment is illustrated in FIG. 12. As shown in FIG. 12, method 700 includes the step 705 of encompassing the primary element 200 in an interior region 600 of the alignment ring 120 such that the interconnecting neck 118 of the primary element is positioned in channel 604 formed in the alignment ring and extends outside of the alignment ring for connection or coupling to process transmitter 102. As discussed above, in the various embodiments, this step 705 of encompassing the primary element in the interior region of the alignment ring can further include using alignment pins 652, 654 or screws 670 extending into the interior region to position the primary element in the interior region as shown in the embodiments of FIGS. 9 and 10. This allows proper alignment of the primary element with the first and second process pipes.

Method 700 also includes the step 710 of inserting the alignment ring 120 and encompassed primary element 200 between the flanges of the first and second process pipes such that the primary element is aligned with the first and second process pipes. In some embodiments, this can include removing an alignment tab 405 from the alignment ring, inserting the alignment ring and encompassed primary element between the flanges, and then reattaching the alignment tab to the alignment ring.

Method 700 also includes the step 715 of inserting the flange fasteners, typically threaded studs or bolts, aligned sets of a corresponding one of the flange apertures in the flange of the first process pipe, one of the alignment apertures of the alignment ring, and one of the flange apertures in the flange of the second process pipe in order to capture the flange fastener and prevent misalignment of the alignment ring or leaking of the process fluid in the event of a pipeline shock or fire. In exemplary embodiments, this step also includes threading nuts onto the end or ends of each threaded fastener and tightening the nuts to seal the assembly and prevent later misalignment, and the resulting leaking which can occur, from a dynamic shock to the process pipeline. Other embodiments, such as those discussed above with reference to FIGS. 1-11, provide further or more specific steps to the method.

The disclosed alignment rings and assemblies increase the integrity of the flange-to-wafer seal by reducing possible flange misalignment. They can also aid in the installation of process transmitters of the type which use wafer style primary elements by aligning the wafer with the pipe flanges. A standard wafer type can thus be made into a lugged style of installation, and existing installations can be easily retrofit. Further, the design can be utilized to align other wafer type units such as vortex meters and butterfly valves. Also, the disclosed alignment rings and assemblies are applicable to a wide variety of primary element wafer sizes, and can be used for thicker wafer sizes so long as the lugged alignment ring is slightly thinner than the wafer in any particular application.

Although the present invention has been described with reference to preferred embodiments, workers skilled in the art will recognize that changes may be made in form and detail without departing from the spirit and scope of the invention.

What is claimed is:

1. A process measurement system alignment device for maintaining alignment of a wafer style primary element between flanges of first and second process pipes, the device comprising:
    an alignment ring having an inner surface forming an interior region into which the primary element can be inserted such that the alignment ring encompasses at least of portion of the primary element;
    a channel formed in the alignment ring and configured to receive an interconnecting neck of the primary element when the primary element is inserted into the interior region of the alignment ring such that the interconnecting neck of the primary element extends outside of the alignment ring; and
    a plurality of flange fastener receiving apertures formed in the alignment ring and configured to be aligned with flange apertures in the flanges of the first and second process pipes and to receive flange fasteners extending through aligned flange apertures.

2. The process measurement system alignment device of claim 1 including a plurality of alignment tabs positioned on one or more outer surfaces of the alignment ring and configured to make contact with one of the flanges of the first and second process pipes to align the alignment ring and the primary element with the process pipes.

3. The process measurement system alignment device of claim 1, wherein the flange fasteners comprise threaded studs or bolts and wherein the flange fastener receiving apertures are threaded apertures configured to receive the threaded studs or bolts.

4. The process measurement system alignment device of claim 3, wherein the plurality of alignment tabs are spaced around the alignment ring.

5. The process measurement system alignment device of claim 4, wherein at least one of the plurality of alignment tabs is configured to be removably attached to the alignment ring such that the at least one of the alignment tabs can be removed to allow the alignment ring to be inserted between the flanges of the first and second process pipes, and subsequently reattached after the alignment ring is positioned between the flanges of the first and second process pipes.

6. The process measurement system alignment device of claim 4, and further comprising a plurality of alignment pins spaced around the inner surface of the alignment ring to maintain the primary element at a proper position within the interior region and thereby aligned with the first and second process pipes.

7. The process measurement system alignment device of claim 6, wherein the plurality of alignment pins include first alignment pins on an upper portion of the inner surface of the alignment ring and second alignment pins on a lower portion of the inner surface of the alignment ring, and wherein the second alignment pins extend further into the interior region than do the first alignment pins.

8. The process measurement system alignment device of claim 4, and further comprising a plurality of alignment screws extending from the one or more outer surfaces of the alignment ring to the inner surface of the alignment ring to adjust a position of the primary element within the interior region and thereby align the primary element with the first and second process pipes.

9. The process measurement system of claim 1, and further comprising a plurality of sleeves configured to be placed over the flange fasteners in order to position the flange fasteners in centers of the flange apertures.

10. A system for measuring a process variable of a process fluid in first and second process pipes having flanges, the system comprising:
  a process transmitter;
  a wafer style primary element having an interconnecting neck for use in coupling the primary element to the process transmitter, the primary element configured to be positioned between the flanges in contact with the process fluid for use in measuring the process variable;
  a plurality of flange fasteners;
  an alignment ring forming an interior region in which the primary element is at least partially positioned, the alignment ring including a channel configured to receive the interconnecting neck of the primary element such that the interconnecting neck of the primary element extends outside of the alignment ring, the alignment ring further comprising a plurality of flange fastener receiving apertures configured to be aligned with flange apertures in the flanges of the first and second process pipes and to receive the flange fasteners extending through aligned flange apertures; and
  a plurality of nuts each fastened to an end of one of the plurality of flange fasteners after each flange fastener has been inserted through a flange aperture in the flange of the first process pipe, a flange fastener receiving aperture in the alignment ring, and flange aperture in the flange of the second process pipe to maintain the primary element in an aligned position in the event of a dynamic shock to the first or second process pipes.

11. The system of claim 10, wherein the plurality of flange fastener receiving apertures in the alignment ring are threaded apertures configured to secure to the flange fasteners.

12. The system of claim 11, wherein the plurality of flange fastener receiving apertures in the alignment ring comprise at least eight flange fastener receiving apertures spaced around the alignment ring to allow the wafer style primary element and process transmitter to be installed in different orientations relative to the first and second process pipes.

13. The system of claim 10, wherein the alignment ring further comprises a plurality of alignment tabs positioned on an outer portion of the alignment ring and configured to make contact with at least one of the flanges of the first and second process pipes to align the alignment ring and the primary element with the first and second process pipes.

14. The system of claim 13, wherein at least one of the plurality of alignment tabs is configured to be removably attached to the alignment ring such that the at least one of the plurality of the alignment tabs can be removed before the alignment ring is inserted between the flanges of the first and second process pipes, and subsequently reattached after the alignment ring is positioned between the flanges of the first and second process pipes.

15. The system of claim 10, and further comprising a plurality of alignment pins spaced around an inner portion of the alignment ring to maintain the primary element at a proper position within the interior region and thereby aligned with the first and second process pipes.

16. The system of claim 15, wherein the plurality of alignment pins include first alignment pins on an upper portion of the alignment ring and second alignment pins on a lower portion of the alignment ring, and wherein the second alignment pins extend further into the interior region of the alignment ring than do the first alignment pins.

17. The system of claim 10, and further comprising a plurality of alignment screws extending from the outer portion of the alignment ring to the inner portion of the alignment ring to adjust a position of the primary element within the interior region and thereby align the primary element with the first and second process pipes.

18. The system of claim 10, and further comprising a plurality of sleeves configured to be placed over the plurality of flange fasteners in order to position the plurality of flange fasteners in centers of the flange apertures.

19. A method of coupling a wafer style primary element of a process measuring system between first and second process pipes to measure a process variable of process fluid in the first and second process pipes, the method comprising:
  encompassing at least a portion of the primary element in an interior region of an alignment ring such that an interconnecting neck of the primary element is positioned in a channel formed in the alignment ring and extends outside of the alignment ring;
  inserting the alignment ring and encompassed primary element between flanges of each of the first and second process pipes such that the primary element is aligned with the first and second process pipes; and
  inserting each of a plurality of flange fasteners through a corresponding one of a plurality of flange apertures in the flange of the first process pipe, through a corresponding one of a plurality of alignment apertures of the alignment ring, and through a corresponding one of a plurality of flange apertures in the flange of the second process pipe in order to capture the flange fastener and prevent misalignment of the alignment ring or leaking of the process fluid in the event of a pipeline shock.

20. The method of claim 19, wherein inserting the alignment ring and encompassed primary element between the flanges of each of the first and second process pipes such that the primary element is aligned with the first and second process pipes further comprises removing an alignment tab from the alignment ring, inserting the alignment ring and encompassed primary element between the flanges of each of the first and second process pipes, and reattaching the alignment tab to the alignment ring.

21. The method of claim 19, wherein encompassing the primary element in the interior region of the alignment ring further comprises using alignment pins or screws extending into the interior region of the alignment ring to position the primary element in the interior region and align the primary element with the first and second process pipes.

* * * * *